US012715162B2

(12) United States Patent
Vetter et al.

(10) Patent No.: US 12,715,162 B2
(45) Date of Patent: Aug. 25, 2026

(54) METHOD FOR THE PRODUCTION OF CELLULAR PLASTIC PARTICLES

(71) Applicant: FOX Velution GmbH, Burgbernheim (DE)

(72) Inventors: Jörg Vetter, Burgbernheim (DE); Mirjam Lucht, Burgbernheim (DE); Josua Schneider, Burgbernheim (DE)

(73) Assignee: FOX Velution GmbH, Burgbernheim (DE)

( * ) Notice: Subject to any disclaimer, the term of this patent is extended or adjusted under 35 U.S.C. 154(b) by 273 days.

(21) Appl. No.: 18/558,129

(22) PCT Filed: Apr. 25, 2022

(86) PCT No.: PCT/EP2022/060838
§ 371 (c)(1),
(2) Date: Oct. 30, 2023

(87) PCT Pub. No.: WO2022/229064
PCT Pub. Date: Nov. 3, 2022

(65) Prior Publication Data

US 2024/0227254 A1 Jul. 11, 2024

(30) Foreign Application Priority Data

Apr. 30, 2021 (DE) .......................... 102021111249.4

(51) Int. Cl.

| | |
|---|---|
| ***B29C 44/34*** | (2006.01) |
| ***B29C 44/44*** | (2006.01) |
| ***C08J 9/12*** | (2006.01) |
| ***C08J 9/18*** | (2006.01) |

(52) U.S. Cl.
CPC ...... *B29C 44/3461* (2013.01); *B29C 44/3453* (2013.01); *B29C 44/445* (2013.01); *C08J 9/122* (2013.01); *C08J 9/18* (2013.01); *C08J 2203/06* (2013.01); *C08J 2205/044* (2013.01); *C08J 2325/06* (2013.01); *C08J 2367/02* (2013.01); *C08J 2369/00* (2013.01); *C08J 2371/12* (2013.01)

(58) Field of Classification Search
CPC .............. B29C 44/3446; B29C 44/445; B29C 44/3461; B29C 44/3453; C08J 9/18; C08J 9/122
See application file for complete search history.

(56) References Cited

U.S. PATENT DOCUMENTS

| | | | |
|---|---|---|---|
| 3,015,479 | A | 1/1962 | Edberg et al. |
| 5,271,886 | A | 12/1993 | Collom et al. |
| 2014/0275306 | A1 | 9/2014 | Watkins et al. |

FOREIGN PATENT DOCUMENTS

| | | |
|---|---|---|
| DE | 19544487 | 6/1997 |
| DE | 102005013040 | 9/2006 |
| DE | 102005130040 | 9/2006 |
| DE | 102013225132 | 6/2015 |

(Continued)

*Primary Examiner* — Stella K Yi
(74) *Attorney, Agent, or Firm* — Rimon PC

(57) ABSTRACT

A method for the production of cellular plastic particles comprising the steps:

Figure 2:
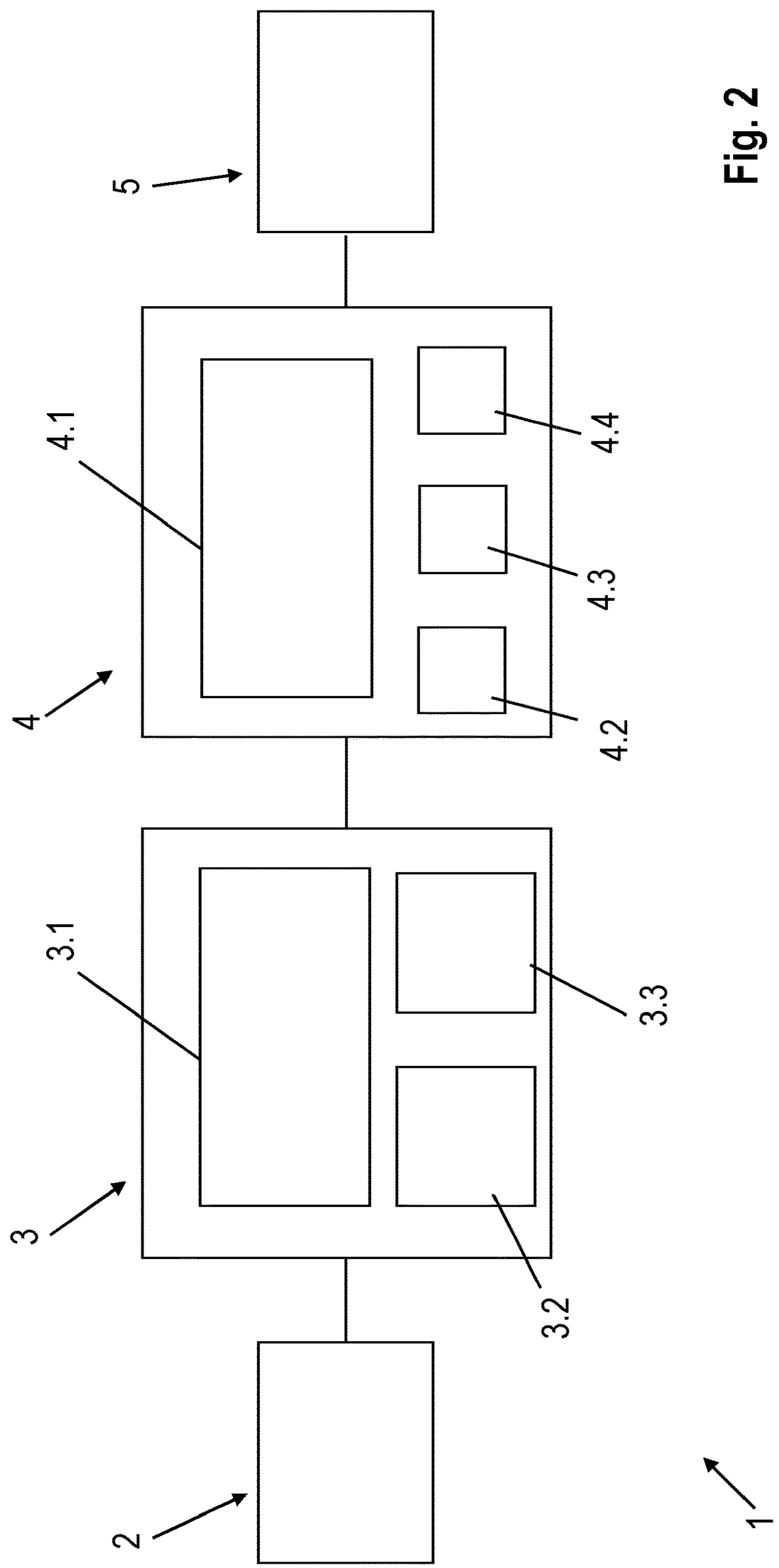

providing a plastic material in the form of compact plastic material particles, loading of the compact plastic material particles with at least one blowing agent under the influence of pressure, expanding the plastic material particles loaded with at least one blowing agent to produce cellular plastic particles under the influence of temperature.

19 Claims, 4 Drawing Sheets

(56) References Cited

FOREIGN PATENT DOCUMENTS

| | | |
|---|---|---|
| EP | 0540271 | 5/1993 |
| EP | 3393745 | 10/2018 |
| JP | 05214151 | 8/1993 |
| JP | 2011105879 | 6/2011 |
| JP | 2016512850 | 5/2016 |
| JP | 2016532737 | 10/2016 |
| JP | 2019065273 | 4/2019 |
| JP | 2021054958 | 4/2021 |
| WO | 2015052265 | 4/2015 |
| WO | 2020196893 | 10/2020 |
| WO | 2021014371 | 1/2021 |

Fig. 1
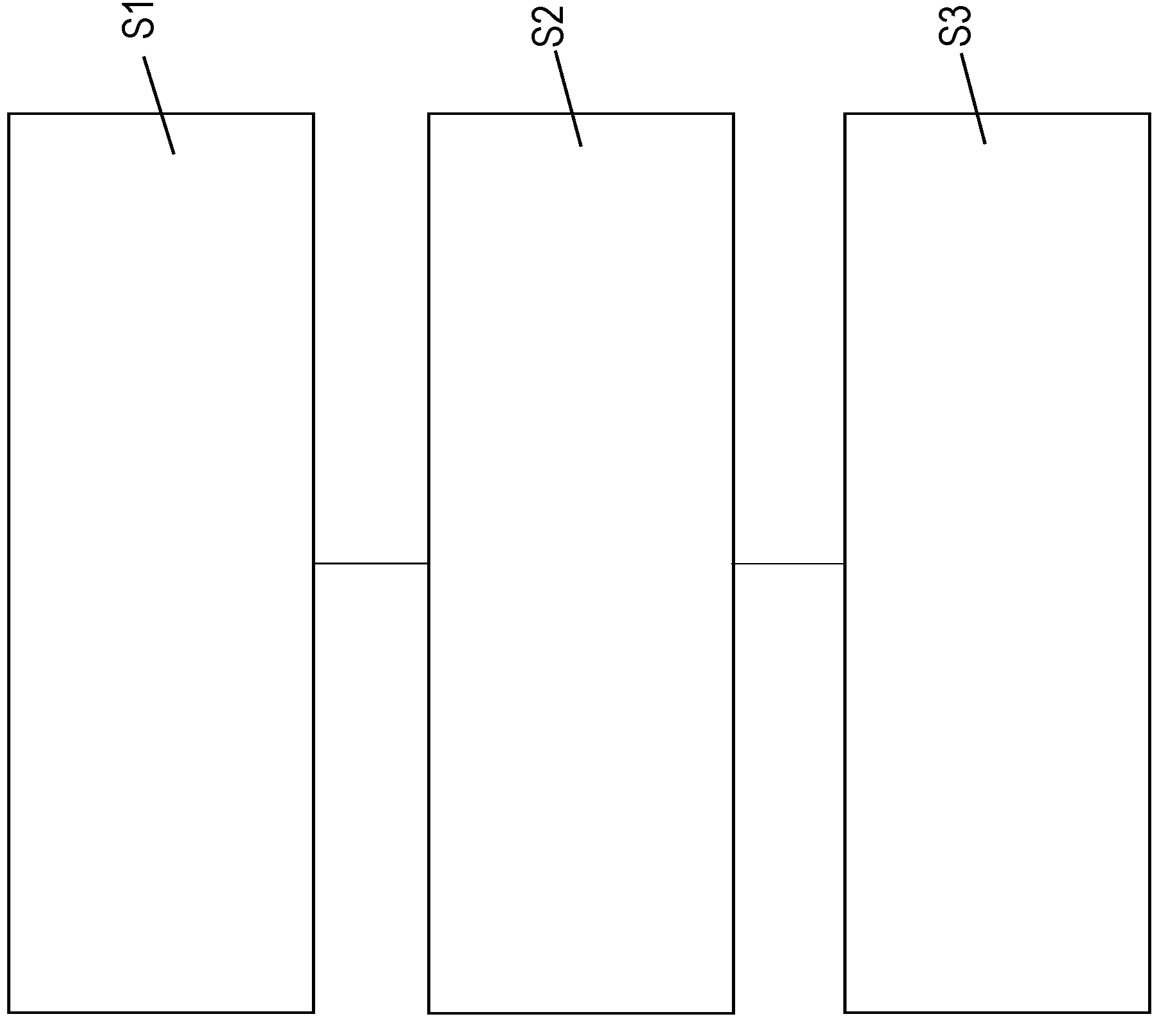

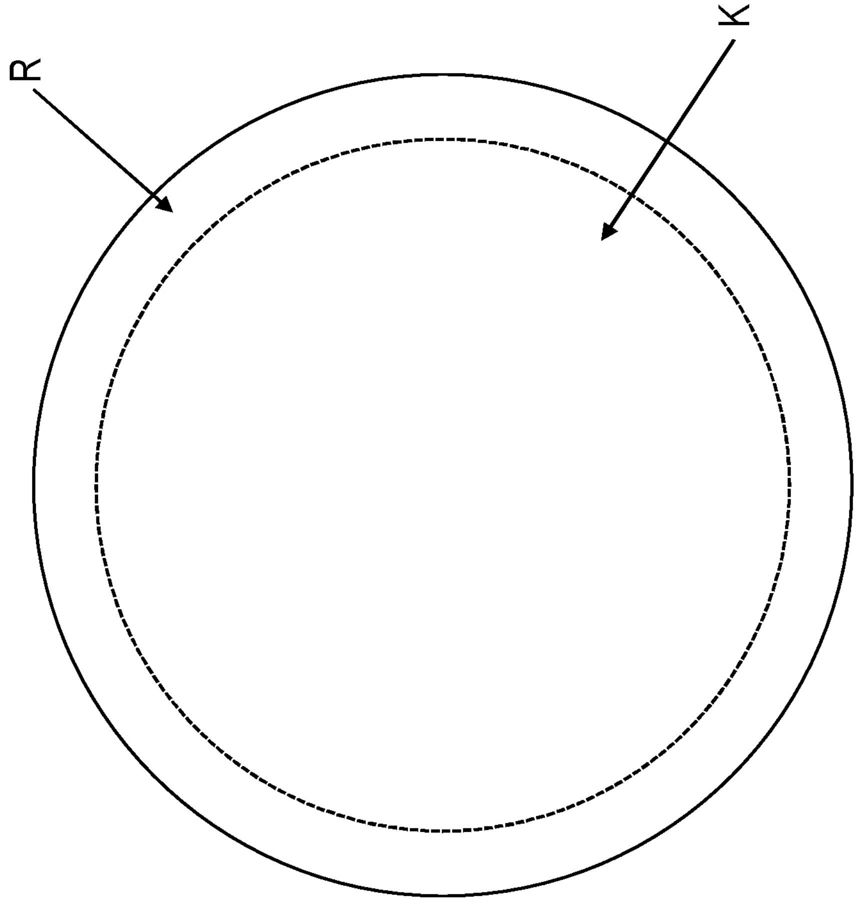
R
K

METHOD FOR THE PRODUCTION OF CELLULAR PLASTIC PARTICLES

The invention relates to a method for the production of cellular plastic particles.

Methods for the production of cellular plastic particles, which are further processed, in particular for the production of particle foam moldings, are basically known from the prior art.

Known methods for the production of cellular plastic particles are based on a two-stage process which, in a first stage, provides for melting a thermoplastic plastic material in an extruder and loading the thermoplastic plastic material melt thus produced within the extruder with a blowing agent and, in a second stage, for granulating or comminuting the thermoplastic plastic material which emerges from the extruder in strand form and expands or expands as a result of the blowing agent.

In the first stage of a corresponding process, the blowing agent is dissolved in the thermoplastic material melt due to the pressure and temperature conditions prevailing in the extruder. After the thermoplastic material loaded with blowing agent has left the extruder, the plastic material expands as a result of the pressure drop and the blowing agent is converted into the gas phase.

In the second stage of a corresponding process, the plastic material is granulated or comminuted, e.g. by means of a cutting device, as it emerges from the extruder in strand form and, as described, immediately expands after leaving the extruder due to the blowing agent, resulting in cellular plastic particles which can be further processed in a separate process to form a particle foam molding.

Known methods are comparatively complex in terms of both equipment and process technology. In addition, the cellular plastic particles that can be produced with known methods are in need of improvement with regard to properties such as size, morphology and distribution of the cells; the possibilities of influencing the corresponding properties of the cellular plastic particles in terms of equipment and process technology are clearly limited in known methods.

On this basis, the present invention is based on the object of providing an improved method for the production of cellular plastic particles, in particular with specifically adjustable properties for subsequent processing into particle foam moldings and their application or use properties.

The object is achieved by means of a method according to claim 1. The claims dependent thereon relate to possible embodiments of the method.

A first aspect of the invention relates to a method for the production cellular plastic particles, the method described herein is thus used for the production cellular plastic particles. The plastic particles that can be produced or are produced according to the method are therefore plastic particles which have a cellular structure at least in sections, and optionally completely. The plastic particles can also have a certain (further) expansion capacity, in particular due to a certain content of blowing agent—be it a residue from the method described or one introduced subsequently in a separate process step. The cellular plastic particles that can be or are produced according to the method can thus be expandable and/or (mechanically) compressible or compressible due to their cellular structure. In all cases, the plastic particles that can be manufactured or produced according to the method can be referred to or deemed to be "foam particles" or "foam beads".

The cellular plastic particles, which can be produced in according to the method and are also referred to as "plastic particles" for short in the following, can be further processed in one or more independent downstream processes to form a particle foam molding. The further processing of the cellular plastic particles into a particle foam molding can be carried out using steam or superheated steam (steam-based) or without the use of steam or superheated steam (non-steam-based or dry).

The steps of the method for the production cellular plastic particles are explained in detail below.

In a first step of the method, a plastic material is provided in the form of compact plastic material particles. The compact plastic material particles provided in accordance with the method can optionally also be referred to as "compact plastic particles". The plastic material to be considered as the starting material, which is typically a thermoplastic plastic material, is thus provided in the first step of the method in the form of compact (thermoplastic) plastic material particles. The compact plastic material provided is thus present in particulate form, i.e. in particular in bulk form or shape. Accordingly, in the first step, generally at least one measure for providing a particulate, i.e. in particular bulk-like or -shaped, compact plastic material in the form of corresponding compact plastic material particles is carried out. The density of the compact plastic material particles provided in the first step of the method typically lies in a range between 0.8 and 2.2 g/cm$^3$, depending on the material composition or modification, from which the compact properties of the provided compact plastic material particles result, the matrix of the provided compact plastic material particles thus has no (appreciable) porous or cellular structure.

The matrix of the compact plastic material particles can contain at least one additive or additive material, such as elongated, spherical or platelet-shaped fillers. In particular, for compact plastic material particles with additives or additive materials, the density can be (significantly) above 1 g/cm$^3$ depending on the concentration. Corresponding additives or materials can themselves be present or act in a cellular form.

The first step of the method can be carried out, optionally at least partially automated or partially automated, by means of a supply device which is configured for the continuous or discontinuous supply of a corresponding plastic material in the form of compact plastic material particles. A corresponding supply device can be, for example, a conveyor device by means of which the compact plastic material particles to be processed into corresponding cellular plastic particles can be conveyed to or into a loading device performing the second step of the method. A corresponding conveying device can, for example, take the form of or comprise a belt conveying device or a flow conveying device. Conveying the compact plastic material particles to or into a loading device performing the second step of the method can thus include picking up the compact plastic material particles in a conveying flow; the compact plastic material particles can thus be conveyed by means of a conveying flow to or into a loading device performing the second step of the method.

In a second step of the method, the compact plastic material particles are loaded with a blowing agent at least under the influence of pressure. The compact plastic material particles are thus loaded with a blowing agent in the second step at least under the influence of pressure—if necessary, depending on the material, a specific (increased) temperature can also be applied in addition to a specific pressure. In the second step, therefore, generally at least one measure for loading the compact plastic material particles with a blowing agent is carried out at least under the influence of pressure, hence at least pressurized. Phenomenologically, an enrichment of the blowing agent in the respective compact plastic material particles typically takes place in the second step of the method. The enrichment of the blowing agent in the respective compact plastic material particles can, in particular depending on the chemical configuration of the compact plastic material particles, the blowing agent as well as the additives or materials possibly contained therein as well as depending on the, as mentioned, typically also material-dependent selected pressure or temperature conditions, for example result from or through absorption and/or dissolution processes of the blowing agent in the respective compact plastic material particles.

Gases, such as carbon dioxide or a mixture containing carbon dioxide and/or nitrogen, such as air, can be used as blowing agents. In general, any combustible or non-combustible organic gases, i.e. in particular butane or pentane; or inert gases, such as noble gases i.e. in particular helium, neon, argon; or nitrogen, or mixtures thereof can be used. The term "blowing agent" can therefore also include a mixture of chemically and/or physically different blowing agents. The blowing agent is typically selected taking into account its solubility in the compact plastic material particles, thus taking into account the chemical and/or physical configuration or composition of the compact plastic material particles. If the compact plastic material particles contain additives or additive materials, the properties, such as the chemical and/or physical configuration of the additives or additive materials, can also be taken into account when selecting the blowing agent.

The second step of the method can be carried out, optionally at least partially automated or partially automated, by means of a loading device which is configured for loading the compact plastic material particles with a blowing agent at least under the influence of pressure or for carrying out a corresponding loading process. A corresponding loading device can, for example, be configured as an autoclave device, i.e. generally as a pressure vessel device comprising a pressure or process chamber, which can be temperature-controlled, or comprise such a pressure vessel device. A corresponding loading device can further comprise a temperature control device, which is configured for temperature control of a corresponding pressure or process chamber. In all cases, a corresponding loading device can comprise a control and/or regulation unit implemented in terms of hardware and/or software, which is configured for controlling and/or regulating, i.e. generally for setting, certain dynamic and/or static pressure and/or temperature parameters within a corresponding pressure or process chamber.

In a third step of the method, the compact plastic material particles loaded with blowing agent are expanded to produce cellular plastic particles under the influence of temperature, i.e. in particular elevated temperature. The compact plastic material particles loaded with blowing agent are thus typically exposed to elevated temperature, i.e. generally thermal energy, in the third step of the method, resulting in outgassing and expansion of the blowing agent contained in the compact plastic material particles. This typically occurs in a dry state, i.e. without the external influence of fluids such as steam or water. In particular, the outgassing of the blowing agent in the thermally softened or softened compact plastic material particles causes the plastic material particles to expand, which after cooling or "freezing" leads to the formation of plastic particles with a permanent cellular structure and thus to the formation of the cellular plastic particles to be produced. Accordingly, in the third step of the method, generally at least one measure is carried out for outgassing or expanding the blowing agent contained in the compact plastic material particles softening or softening at least due to the influence of temperature and thus at least thermally, in order to produce cellular plastic particles. Phenomenologically, in the third step of the method, in particular due to the desorption of the blowing agent from the softening or softened compact plastic material particles, cell formation and cell growth take place within the compact plastic material particles, which leads to the cellular plastic particles to be produced. The cell formation is typically based on the aforementioned desorption of the blowing agent at nucleation points in the plastic material particles softening or softened by temperature influence, while the cell growth is typically based on an overpressure-induced expansion of the blowing agent in already formed cells. As also mentioned, the cellular structure formed in this way or the expansion state realized with it is permanently "frozen" or fixed by the or a temperature reduction of the cellular plastic particles produced in this way, i.e. by their cooling, e.g. in the environment.

Basically, after the pressurization in the second step of the method, i.e. after a pressure drop, in particular to normal or standard conditions, desorption processes take place within the respective compact plastic material particles which are loaded with blowing agent and typically softened due to thermal conditions. The desorption processes of the blowing agent represent an essential prerequisite for the cell formation and cell growth processes within respective plastic material particles required for the production of cellular plastic particles. In the third step of the method, the cellular plastic particles to be produced according to the method are formed from the compact plastic material particles present after the second step of the method, which are loaded with blowing agent and typically softened for thermal reasons, in particular as a result of corresponding desorption processes. As will be explained in the following, cellular structures with locally different cell properties and thus graded cellular plastic particles can be realized by controlling corresponding desorption-related cell formation and cell growth processes.

The inventors assume that, with suitably compact starting material, nucleation in conjunction with targeted adjustment of the softening behavior is surprisingly likely to have a decisive influence on the desorption of the blowing agent. In particular, a large number of small cells can be formed by a large number of individual nucleation points or sites, resulting in a fine cell structure within respective cellular plastic particles. A corresponding fine cell structure is characterized in particular by small cells and a largely homogeneous distribution thereof within respective cellular plastic particles.

In general, cellular plastic particles with a cell size in the range between 0.5 and 250 μm can be produced. The actual cell size—of course an average is typically referred to here—can therefore be adjusted over a very wide range and thus tailored to the process, depending on the selected process conditions. The same applies to any distribution of cell sizes within the respective cellular plastic particles.

In particular, cellular plastic particles with a (mean) cell size below 100 μm, in particular below 90 μm, further in particular below 80 μm, further in particular below 70 μm, further in particular below 60 μm, further in particular below 50 μm, further in particular below 45 μm, further in particular below 40 μm, further in particular below 35 μm, further in particular below 30 μm, further in particular below 25 μm, further in particular below 24 μm, further in particular below 23 μm, further in particular below 22 μm, further in particular below 21 μm, further in particular below 20 μm, further in particular below 19 μm, further in particular below 18 μm, further in particular below 17 μm, further in particular below 16 μm, further in particular below 15 μm, further in particular below 14 μm, further in particular below 13 μm, further in particular below 12 μm, further in particular below 11 μm, further in particular below 10 μm, or even smaller. All intermediate values not explicitly listed here are also conceivable.

The third step of the method can be carried out, if necessary, at least partially automated or partially automated, by means of an expansion device which is configured to expand the blowing agent for the production of cellular plastic particles at least under the influence of temperature or to carry out a corresponding expansion process. A corresponding expansion device can, for example, be configured as a heating device, i.e. generally as a temperature control device comprising a temperature-controllable or temperature-controlled temperature control or process chamber, or comprise such a temperature control device. A corresponding tempering device can further comprise a conveying device, which is configured for conveying the plastic material particles to be expanded along a conveying path through a corresponding tempering or process chamber. In all cases, a corresponding expansion device can comprise a control and/or regulation unit implemented in terms of hardware and/or software, which is configured for controlling and/or regulating, i.e. generally for setting, certain dynamic and/or static conveying and/or temperature and/or radiation parameters within a corresponding temperature control or process chamber.

In particular, the third step of the method can be carried out continuously, if necessary, which is advantageous over batchwise processes.

The density of the cellular plastic particles produced in the third step of the method is typically significantly below the initial density of the compact plastic material particles provided in the first step, resulting in the cellular properties of the plastic material particles that can be produced or produced according to the method; the plastic material particles that can be produced or produced according to the method therefore have a cellular structure. The bulk density of the cellular plastic particles produced in the third step of the method is typically many times lower than the bulk density of the compact plastic material particles provided in the first step of the method.

The cellular plastic particles produced in the third step of the method can be expandable, as mentioned further above; this can be an essential property for the described, in particular steam-based or non-steam-based, further processing of the cellular plastic particles to produce particle foam moldings.

Compared to known methods, the method is therefore characterized by a special dynamic process control, which requires a softening necessary for expansion but, in contrast to an extrusion process, no complete melting of a compact plastic material loaded with blowing agent and thus no pressure- and temperature-intensive loading of a plastic material melt with a blowing agent. The dynamic process control, i.e. in particular the rapid (volume) heating possible with it, is also important for good energy efficiency and the significantly finer cell morphology mentioned further below (due to the lack of time for cell unions). The process is therefore associated with a comparatively (significantly) simplified equipment and process engineering effort for its implementation, as compact plastic particles can be loaded with a blowing agent, and corresponding plastic material particles loaded with blowing agent can be converted into cellular plastic particles at least under the influence of temperature, in particular under the influence of temperature and pressure.

In addition, the properties of the cellular plastic particles that can be manufactured or produced according to the method are improved, in particular with regard to the size, morphology and distribution of the cells, which results from the easily adjustable and very well controllable process conditions in the course of the loading that takes place in the second step of the method and in the course of the expanding that takes place in the third step of the method.

The method thus enables a significantly extended process window that can be precisely set or controlled for each plastic material, which in principle makes it possible to produce cellular plastic particles with desired properties from any (thermoplastic) compact plastic material particles.

As indicated, the loading of the compact plastic material particles with a blowing agent can be carried out under the influence of pressure and temperature. The parameters that can thus be varied for loading the compact plastic material particles with blowing agent and, in the further course, for the specific setting of certain properties of the cellular plastic particles to be produced or produced, in particular depending on the material, are thus first of all the pressure and temperature conditions prevailing in the second step of the method. Of course, the time, i.e. in particular the duration of the pressure and temperature conditions, in the second step of the method is also a parameter which has an influence on the loading of the compact plastic material particles with blowing agent, i.e. in particular the dissolution of the blowing agent in the compact plastic material particles.

Specific parameters for carrying out the second step of the method are given below as examples:

The loading of the compact plastic material particles with the or a blowing agent can, for example, in particular depending on the chemical composition of the compact plastic material particles and/or the blowing agent, at a pressure in a range between 1 and 200 bar, in particular in a range between 1 and 190 bar, further in particular in a range between 1 and 180 bar, further in particular in a range between 1 and 170 bar, further in particular in a range between 1 and 160 bar, further in particular in a range between 1 and 150 bar, further in particular in a range between 1 and 140 bar, further in particular in a range between 1 and 130 bar, further in particular in a range between 1 and 120 bar, further in particular in a range between 1 and 110 bar, further in particular in a range between 1 and 100 bar, further in particular in a range between 1 and 90 bar, further in particular in a range between 1 and 80 bar, further in particular in a range between 1 and 70 bar, further in particular in a range between 1 and 60 bar, further in particular in a range between 1 and 50 bar, further in particular in a range between 1 and 40 bar, further in particular in a range between 1 and 30 bar, further in particular in a range between 1 and 20 bar, further in particular in a range between 1 and 10 bar. Instead of 1 bar, 2, 3, 4, 5, 6, 7, 8, 9 or 10 bar can also be used as the lower limit. All intermediate values not explicitly enumerated here are equally conceivable. The pressures mentioned above, as mentioned, by way of example, refer in particular to pressures within a pressure or process chamber of a corresponding loading device during the execution of the second step of the method.

The loading of the compact plastic material particles with the or a blowing agent can, for example, in particular depending on the chemical composition of the compact plastic material particles and/or the blowing agent, at a temperature in a range between 0 and 250° C., in particular in a range between 0 and 240° C., further in particular in a range between 0 and 230° C., further in particular in a range between 0 and 220° C., further in particular in a range between 0 and 210° C., further in particular in a range between 0 and 200° C., further in particular in a range between 0 and 190° C., further in particular in a range between 0 and 180° C., further in particular in a range between 0 and 170° C., further in particular in a range between 0 and 160° C., further in particular in a range between 0 and 150° C., further in particular in a range between 0 and 140° C., further in particular in a range between 0 and 130° C., further in particular in a range between 0 and 120° C., further in particular in a range between 0 and 110° C., further in particular in a range between 0 and 100° C., further in particular in a range between 0 and 90° C., further in particular in a range between 0 and 80° C., further in particular in a range between 0 and 70° C., further in particular in a range between 0 and 60° C., further in particular in a range between 0 and 50° C., further in particular in a range between 0 and 40° C., further in particular in a range between 0 and 30° C., further in particular in a range between 0 and 20° C. All intermediate values not explicitly enumerated here are equally conceivable. The temperatures mentioned above, as mentioned, by way of example, refer in particular to temperatures within a pressure or process chamber of a corresponding loading device during the execution of the second step of the method.

The loading of the compact plastic material particles with the or a blowing agent can, for example, in particular depending on the chemical composition of the compact plastic material particles and/or the blowing agent, for a period of time in a range between 1 and 1000 h, in particular in a range between 1 and 950 h, further in particular in a range between 1 and 900 h, further in particular in a range between 1 and 850 h, further in particular in a range between 1 and 800 h, further in particular in a range between 1 and 750 h, further in particular in a range between 1 and 700 h, further in particular in a range between 1 and 650 h, further in particular in a range between 1 and 600 h, further in particular in a range between 1 and 550 h, further in particular in a range between 1 and 500 h, further in particular in a range between 1 and 450 h, further in particular in a range between 1 and 400 h, further in particular in a range between 1 and 350 h, further in particular in a range between 1 and 300 h, further in particular in a range between 1 and 250 h, further in particular in a range between 1 and 200 h, further in particular in a range between 1 and 150 h, further in particular in a range between 1 and 100 h, in particular in a range between 1 and 90 h, in particular in a range between 1 and 80 h, in particular in a range between 1 and 70 h, in particular in a range between 1 and 60 h, in particular in a range between 1 and 50 h, in particular in a range between 1 and 40 h, in particular in a range between 1 and 30 h, in particular in a range between 1 and 20 h, in particular in a range between 1 and 10 h. All intermediate values not explicitly enumerated here are equally conceivable. The above-mentioned, as mentioned, exemplary durations refer in particular to the pressurization or temperature application of the plastic material particles within a pressure or process chamber of a corresponding loading device during the execution of the second step of the method.

Specific parameters for carrying out the third step of the method are given below as examples:

The expansion of the plastic material particles loaded with blowing agent for the production of the cellular plastic particles under the influence of temperature, in particular depending on the chemical composition of the plastic particle material loaded with blowing agent and/or the blowing agent, can be carried out, for example, at normal pressure, i.e. an ambient pressure of approx. 1 bar. A special pressure level, such as an overpressure or underpressure level, is therefore possible, but not mandatory, for expanding the compact plastic material particles loaded with blowing agent to produce the cellular plastic particles, which fundamentally simplifies the expansion process.

Expanding the plastic material particles loaded with blowing agent to produce the cellular plastic particles under the influence of temperature can, for example, in particular depending on the chemical composition of the plastic particle material loaded with blowing agent and/or of the blowing agent, at a temperature in a range between 0 and 300° C., in particular in a range between 0 and 290° C., further in particular in a range between 0 and 280° C., further in particular in a range between 0 and 270°, further in particular in a range between 0 and 260° C., further in particular in a range between 0 and 250° C., further in particular in a range between 0 and 240° C., further in particular in a range between 0 and 230° C., further in particular in a range between 0 and 220° C., further in particular in a range between 0 and 210° C., further in particular in a range between 0 and 200° C., further in particular in a range between 0 and 190° C., further in particular in a range between 0 and 180° C., further in particular in a range between 0 and 170° C., further in particular in a range between 0 and 160° C., further in particular in a range between 0 and 150° C., further in particular in a range between 0 and 140° C., further in particular in a range between 0 and 130° C., further in particular in a range between 0 and 120° C., further in particular in a range between 0 and 110° C., further in particular in a range between 0 and 100° C., further in particular in a range between 0 and 90° C., further in particular in a range between 0 and 80° C., further in particular in a range between 0 and 70° C., further in particular in a range between 0 and 60° C., further in particular in a range between 0 and 50° C., further in particular in a range between 0 and 40° C., further in particular in a range between 0 and 30° C., further in particular in a range between 0 and 20° C. All intermediate values not explicitly enumerated here are equally conceivable. The above-mentioned temperatures can refer in particular to an inlet temperature when the compact plastic material particles loaded with blowing agent enter a corresponding expansion device and/or to an outlet temperature when the cellular plastic particles exit a corresponding expansion device. Corresponding inlet and outlet temperatures can be the same, similar or different. Provided that a corresponding expansion device comprises a conveying device, which is arranged to convey the plastic material particles loaded with blowing agent along corresponding tempering devices, the aforementioned temperatures can refer to a temperature upon entry of the compact plastic particle material loaded with a blowing agent into a corresponding expansion or tempering device (entry temperature). temperature (inlet temperature), i.e. to an initial area of a corresponding conveying device, and/or to an outlet temperature when the plastic particles leave a corresponding expansion or temperature control device (outlet temperature), i.e. to an end area of a corresponding conveying device. Typically, the inlet temperature is lower than the outlet temperature.

The expansion of the compact plastic material particles loaded with blowing agent under the influence of temperature can be achieved by irradiating the compact plastic material particles loaded with blowing agent with high-energy thermal radiation, in particular infrared radiation. In particular, infrared radiation with wavelengths in a range between 1 and 15 μm, in particular between 1.4 and 8 μm, further in particular between 1.4 and 3 μm, is considered. The wavelengths of the infrared radiation are typically selected depending on the material. The temperature control, i.e. in particular the heating, of the compact plastic material particles loaded with blowing agent can, in particular depending on the material, be achieved by selecting and/or adjusting the properties of high-energy radiation, i.e. in particular its wavelength. This means that the heating of the compact plastic material particles loaded with blowing agent can be carried out in a targeted manner, in particular depending on the material, by selecting and/or adjusting the properties of energy-rich radiation, i.e. in particular its wavelength, without risking a softening of the compact plastic material particles loaded with blowing agent, which is undesirable for the expansion method for the plastic material particles loaded with blowing agent, i.e. undesirable melting or through-melting of the softened plastic material particles. Investigations have shown that infrared radiation is particularly suitable for this purpose, as it enables targeted and, in conjunction with a conveying device, very easily controllable volume heating of the compact plastic material particles loaded with blowing agent, a controllable softening process and thus—this is essential for setting the properties of the cellular plastic particles to be produced—a controllable expansion process.

In particular, the expanding of the plastic material particles loaded with blowing agent can be effected under the influence of temperature by irradiating the compact plastic material particles loaded with a blowing agent with high-energy thermal radiation, in particular infrared radiation, wherein the plastic material particles loaded with blowing agent are conveyed on at least one conveying path defined by a conveying device, in particular continuously, along at least one corresponding high-energy radiation, i.e. in particular infrared radiation, generating radiation generating device. A corresponding radiation generating device can in particular be configured as or comprise an infrared oven, in particular a continuous infrared oven. A corresponding infrared oven can comprise one or more infrared emitters arranged or formed along a corresponding conveying path. Corresponding infrared emitters can, for example, have a radiation power, which can be variable, in a range between 1 and 500 kW, further in particular in a range between 1 and 450 kW, further in particular in a range between 1 and 400 kW, further in particular in a range between 1 and 350 kW, further in particular in a range between 1 and 300 kW, further in particular in a range between 1 and 250 kW, further in particular in a range between 1 and 200 kW, further in particular in a range between 1 and 150 kW, further in particular in a range between 1 and 100 kW, further in particular in a range between 1 and 50 kW. Instead of 1 kW, 2, 3, 4, 5, 6, 7, 8, 9 or 10 kW can also be used as a lower limit. All intermediate values not explicitly listed here are also conceivable. The above-mentioned outputs can refer in particular to area output per $m^2$. Investigations have shown that area outputs between 5 and 100 $kW/m^2$ in particular deliver good results. Variable radiators or variable radiator (area) outputs can be used to generate different temperature zones, which also provides a parameter for influencing the expansion process.

According to the method, after the expansion of the plastic material particles loaded with blowing agent for the production of the cellular plastic particles, cooling of the produced cellular plastic particles can be carried out under the influence of a temperature (in particular lower than that of the previous expansion process), as indicated above. The cooling, which is expediently carried out rapidly, can result in a "freezing" of the cellular structure of the cellular plastic particles after the expansion process. In this way, further, integral or even only local expansion of the plastic particles, which can be undesirable after the expansion process, can be specifically prevented, for example in order to retain a cellular structure of the plastic particles which can be desired after the expansion process. In particular, cooling can be carried out from a process temperature above a reference temperature, in particular room temperature can be used as a reference temperature, to a cooling temperature below the process or reference temperature, in particular room temperature. Separate tempering devices for cooling the plastic particles are therefore not absolutely necessary, but it can be sufficient if the plastic particles are cooled to room temperature or aged at room temperature after the expansion process.

According to the method, as also indicated above, a compact plastic particle material containing at least one, in particular functional, additive or additive material, for example a fibrous substance or material and/or a dye or coloring material and/or a nucleating substance or material and/or a substance or material, such as additives for adjusting a melt viscosity, such as chain extenders, or for increasing the absorption coefficient, such as graphite, carbon black, etc., can be provided or used, to specifically influence or control the softening behavior of the plastic material particles loaded with blowing agent, containing compact plastic particle material, can be provided or used. Accordingly, compounded compact plastic material particles can also be loaded with blowing agent and expanded, resulting in cellular plastic particles with special properties. In particular, tailor-made plastic particles can be produced for specific applications or fields of application through a targeted selection and concentration of appropriate additives or materials. The additives or materials can have been introduced into the compact plastic material particles during their manufacture.

Particularly by means of fibrous substances or materials—which can basically be organic or inorganic fibrous substances or materials, e.g. aramid, glass, carbon or natural fibers—special material properties of the cellular plastic particles that can be or are produced according to the method or of a molded particle foam part produced from the cellular plastic particles that can be or are produced according to the method can be realized with regard to further processing. Corresponding cellular plastic particles or particle foam moldings produced from these can be characterized on the one hand by a special density due to their cellular structure and on the other hand in particular by special mechanical properties due to mechanical connections of adjacent cells within respective cellular plastic particles and/or between respective adjacent cellular plastic particles resulting from processing. During subsequent processing into particle foam moldings, these special mechanical properties can be utilized locally or integrally or can be further modified. The same applies—basically irrespective of their chemical composition—to non-fiber-like or -shaped additives or additive materials, such as spherical or -shaped or platelet-like or -shaped organic and/or inorganic additives or additive materials.

In addition to specifically influencing the mechanical properties of the plastic particles, it is also possible, for example, to specifically influence the electrical properties and/or the thermal properties of the plastic particles by means of appropriate additives or materials. Thus, plastic particles with special electrically and/or thermally conductive properties can be produced, for example by using electrically and/or thermally conductive additives or materials, such as metal and/or carbon black particles, etc.

The concentration of corresponding additives or additive materials can in principle be freely selected, although typically depending on the material. Thus, it is merely indicated by way of example that compact plastic material particles with one (or more) additive(s) or additive material(s) can be provided or used in a (respective) concentration between 0.01 wt. %, this applies in particular to chemically active additives, and 60 wt. %, this applies in particular to fibrous additives. As indicated, the concentration typically depends on the specific chemical and/or physical properties of the additives or additive materials or their combination.

It was mentioned that, in principle, any thermoplastic material can be provided or used as starting material. By way of example only, it is to be understood that, according to the method, a plastic particle material from the group: Acrylonitrile-butadiene-styrene, Acrylonitrile-butadiene-styrene blend, Polyamide, Polyamide blend, Polycarbonate, Polycarbonate blend, Polyethylene, Polyethylene blend, Polypropylene, Polypropylene blend, Polyphenylene ether, Polyphenylene ether blend, thermoplastic elastomer, polyethylene terephthalate, polyethylene terephthalate blend, polybutylene terephthalate, polybutylene terephthalate blend, polystyrene, polystyrene blend, polyvinyl chloride, thermoplastic elastomer blend. used. Blends or mixtures of different thermoplastic materials can also be used; modified PPE (mPPE) is merely mentioned as an example in this context.

If blends are used which contain at least two components differing in at least one chemical and/or physical parameter and/or parameter relating to the molecular configuration, these can in principle be present in any desired proportionate compositions, the respective proportions adding up to 100% by weight. Accordingly, a first constituent can have any proportion by weight between 1 and 99% by weight and a second constituent can have any proportion by weight between 99 and 1% by weight, the respective proportions adding up to 100% by weight. Of course, proportions below 1 wt. % and above 99 wt. % are also conceivable.

All plastic materials used can, as mentioned, be provided with one or more additives, such as fibers. All plastic materials used can be recyclates or contain a proportion of recyclates.

It was mentioned that the properties of the cellular plastic particles that can be produced or manufactured according to the method can be influenced in particular by the process conditions during the loading process and the expansion process.

According to the method, cellular plastic particles with a uniformly or non-uniformly distributed cellular structure can be produced, depending on the selected process conditions. The properties, i.e. in particular the distribution of the cellular structure, within the respective cellular plastic particles can therefore (also) be influenced by pressure, temperature and time during loading or expanding as well as by the conveying or dwell times or conditions between the individual method steps, in addition to material-specific parameters.

If cellular plastic particles with an unevenly distributed cellular structure are produced according to the method, the respective cellular plastic particles can have a different number and/or morphology of cells in a peripheral region than in a core region. Graded cellular plastic particles can therefore be produced which have a special range of properties due to the different distribution of the number of cells and/or cell morphology. Graded cellular plastic particles can therefore, for example in the manner of core-shell particles, have different cellular properties in an (outer) peripheral region than in an (inner) core region.

Correspondingly configured cellular plastic particles can be achieved in particular by (too) short loading of the compact starting material with blowing agent, which then only accumulates close to the periphery, so that expansion then takes place, especially at the periphery. Conversely, an (excessively) long ageing period between blowing agent loading and expansion can lead to cellular plastic particles in which predominantly the "core" is foamed.

In general, cellular plastic particles with a cell size in the range between 0.5 and 250 μm can be produced. The actual cell size—of course an average is typically referred to here—can therefore be adjusted over a very wide range and thus tailored to the process, depending on the selected process conditions. The same applies to any distribution of the cell size within the respective cellular plastic particles.

In general, it is also true that, depending in particular on the degree of expansion and, where appropriate, the filler content, cellular plastic particles with a bulk density in a range between 20 and 1500 g/I can be produced by the process. The actual bulk density—here, too, of course, an average is typically referred to—can thus be adjusted over a very wide range and thus tailor-made, depending on the selected process conditions.

The following is a purely exemplary list of compact plastic material particles that can be specifically processed or processed as part of the process, as well as associated parameters for carrying out the second and third steps of the process:

In a first example, a compact polycarbonate plastic granulate, i.e. plastic material particles of polycarbonate, with a bulk density in the range between 650 and 720 g/I was provided in the first step of the method. In the second step of the method, the compact plastic material particles were loaded without separate tempering in a pressure vessel at a pressure in the range between 37 and 55 bar for a period of 18 h with carbon dioxide as blowing agent. In the third step of the method, the plastic material particles loaded with blowing agent were expanded by conveying, in particular continuously or discontinuously, the compact plastic material particles loaded with blowing agent through an infrared continuous furnace comprising a plurality of infrared emitters, i.e. by conveying the plastic material particles along a conveying or tempering section of a length of about 5 m formed by a plurality of tempering elements in the form of infrared emitters with a total emitter power of about 10 kW. The temperature of the conveyor belt at the inlet of the conveyor section was approx. 140° C., the temperature of the conveyor belt at the outlet of the conveyor/tempering section was approx. 180° C. The conveying speed was about 700 mm/s. The cellular plastic particles produced in this way had a bulk density of approx. 100 g/l.

In a second example, a compact polycarbonate/polyethylene terephthalate plastic granulate, i.e. plastic material particles made from a polycarbonate/polyethylene terephthalate blend, with a bulk density of approx. 680 g/I was provided in the first step of the method. In the second step of the method, the compact plastic material particles were loaded with carbon dioxide as blowing agent in a pressure vessel at a pressure of approx. 50 bar for a period of 20 h without separate tempering. In the third step of the method, the plastic material particles loaded with blowing agent were expanded by conveying, in particular continuously or discontinuously, the compact plastic material particles loaded with blowing agent through an infrared continuous furnace comprising a plurality of infrared emitters, i.e. by conveying the plastic material particles along a conveying or tempering section of a length of about 5 m formed by a plurality of tempering elements in the form of infrared emitters with a total emitter power of about 10 kW. The temperature of the conveyor belt at the inlet of the conveyor section was approx. 80° C., the temperature of the conveyor belt at the outlet of the conveyor or temperature control section was approx. 240° C. The conveying speed was about 450 mm/s. The cellular plastic particles produced in this way had a bulk density of approx. 340 g/l.

In a third example, a compact polybutylene terephthalate plastic granulate, i.e. plastic material particles of polybutylene terephthalate, with a bulk density of approx. 740 g/I were provided in the first step of the method. In the second step of the method, the compact plastic material particles were loaded with carbon dioxide as blowing agent in a pressure vessel at a pressure of about 50 bar for a period of 80 h without separate tempering. In the third step of the method, the plastic material particles loaded with blowing agent were expanded by conveying, in particular continuously or discontinuously, the compact plastic material particles loaded with blowing agent through an infrared continuous furnace comprising a plurality of infrared emitters, i.e. by conveying the plastic material particles along a conveying or tempering section of a length of about 5 m formed by a plurality of tempering elements in the form of infrared emitters with a total emitter power of about 20 kW. The temperature of the conveyor belt at the inlet of the conveyor section was approx. 100° C., the temperature of the conveyor belt at the outlet of the conveyor/tempering section was approx. 220° C. The conveying speed was about 450 mm/s. The cellular plastic particles produced in this way had a bulk density of approx. 100 g/l.

In a fourth example, a compact polyphenylene ether/polystyrene plastic granulate, i.e. plastic material particles of a polyphenylene ether/polystyrene blend, with a bulk density of about 715 g/I was provided in the first step of the method. In the second step of the method, the compact plastic material particles were loaded with carbon dioxide as blowing agent in a pressure vessel at a pressure of approx. 55 bar for a period of 120 h without separate tempering. In the third step of the method, the plastic material particles loaded with blowing agent were expanded by conveying, in particular continuously or discontinuously, the compact plastic material particles loaded with blowing agent through an infrared continuous furnace comprising a plurality of infrared emitters, i.e. by conveying the plastic material particles along a conveying or tempering section of a length of about 5 m formed by a plurality of tempering elements in the form of infrared emitters with a total emitter power of about 18 kW. The temperature of the conveyor belt at the inlet of the conveyor section was approx. 80° C., the temperature of the conveyor belt at the outlet of the conveyor/tempering section was approx. 220° C. The conveying speed was about 400 mm/s. The cellular plastic particles produced in this way had a bulk density of approx. 180 g/l.

A second aspect of the invention relates to a particulate foam material formed by or comprising cellular plastic particles produced according to the method for the first aspect.

A third aspect of the invention relates to a method for processing a plastic particulate material according to the second aspect to produce a particulate foam molding.

A fourth aspect relates to an apparatus for the production cellular plastic particles, in particular according to a method according to the first aspect, comprising:

- a first device which is configured for loading the compact thermoplastic with a blowing agent under the influence of pressure, the device comprising in particular a loading device, e.g. in the form of a pressure vessel device; and
- a second device which is configured for expanding the blowing agent for the production cellular plastic particles under the influence of temperature, the device comprising in particular an expansion device, for example in the form of a radiation generating device for generating high-energy radiation, in particular infrared radiation.

The second device can comprise a conveying device, in particular a combined conveying and temperature control device. A corresponding combined conveying and temperature control device can, for example, be configured as a continuous furnace, in particular as an infrared continuous furnace comprising one or more infrared emitters, or can comprise at least one such furnace.

The second device can also be assigned a stress-relieving device, such as a stress-relieving chamber, in which the manufactured cellular plastic particles are stored under defined chemical and/or physical conditions, i.e. in particular defined temperature ratios, for a defined time. A corresponding stress-relieving device can, for example, be configured as a decompression device or comprise such a device.

It is conceivable that the apparatus further comprises the or a conveying device, by means of which the produced cellular plastic particles are continuously or discontinuously conveyed through a corresponding relaxation space.

The apparatus can further comprise suitable handling devices for handling the compact plastic material particles for providing them and/or for removing the produced cellular plastic particles. Corresponding handling devices can also be configured as or comprise conveying devices. In particular, suitable conveying devices, such as pneumatic conveying devices, which are configured to form a conveying flow, are considered for conveying bulk material.

The apparatus can basically comprise a conveying device by means of which the compact plastic material particles or, further on, the cellular plastic particles can be conveyed continuously or discontinuously through the individual devices of the apparatus.

All embodiments relating to the method according to the first aspect apply analogously to the particulate foam material according to the second aspect, the method according to the third aspect, and the apparatus according to the fourth aspect.

Figure 3:
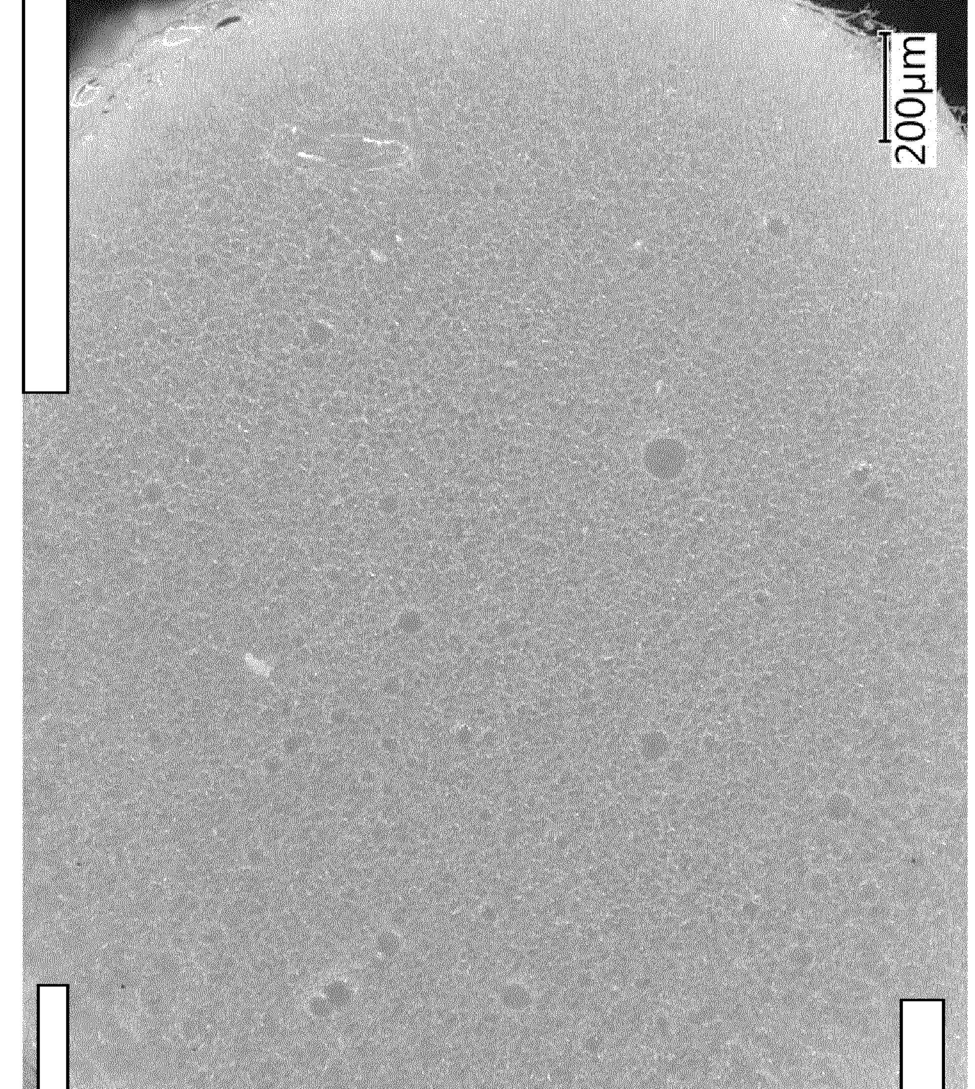

The invention is explained again in the following by way of examples of embodiments with reference to FIG. The Figures show in:

FIG. 1 a flowchart illustrating a method according to an embodiment;

FIG. 2 a principle representation of an apparatus for carrying out a method according to an embodiment; and FIGS. 3, 4 each a principle representation of a cellular plastic particle produced according to the method in accordance with an embodiment example.

FIG. 1 shows a flowchart illustrating a method according to an embodiment.

The method is a method for the production cellular plastic particles; the method is thus used for the production cellular plastic particles. The plastic particles that can be produced or are produced in according to the method are therefore plastic particles which have a cellular structure at least in sections, and optionally completely. The plastic particles can also have a certain (further) expansion or compression capacity, in particular due to a certain content of blowing agent—be it a residue from the process described or one introduced subsequently in a separate method step. The cellular plastic particles that can be produced or manufactured according to the method can thus be expandable and/or (mechanically) compressible.

The cellular plastic particles that can be manufactured or produced according to the method can be further processed in one or more independent downstream processes to form a particle foam molding. The further processing of the plastic particles into a particle foam molding can be carried out using steam or superheated steam (steam-based) or without the use of steam or superheated steam (non-steam-based or dry).

The steps of the method for the production cellular plastic particles are explained in more detail below with reference to FIGS. 1 and 2.

In a first step S1 of the method, a plastic material is provided in the form of compact plastic material particles. The provided compact plastic material particles can optionally also be referred to as "compact plastic particles". The compact plastic material particles to be considered as starting material, which are typically thermoplastic plastic material particles, are thus provided in the first step of the method. The starting material provided is thus present in particulate form, i.e. in particular in bulk form or shape. Accordingly, in the first step, generally at least one measure for providing a particulate, i.e. in particular bulk-like or -shaped, (thermoplastic) plastic material in the form of corresponding compact plastic material particles is carried out. The density of the plastic material particles provided in the first step of the method typically lies in a range between 0.8 and 2.2 g/cm$^3$, depending on the material composition or modification, from which the compact properties of the provided compact plastic material particles result, the matrix of the provided compact plastic material particles thus does not have a porous or cellular structure.

However, the matrix of the compact plastic material particles can contain at least one additive or additive material, such as elongated, spherical or platelet-shaped fillers. In particular for compact plastic material particles with additives or additive materials, the density can be (significantly) above 1 g/cm$^3$ depending on the concentration. Corresponding additives or materials can be present or act in a cellular form.

The first step S1 of the method can be carried out, if necessary, at least partially automated or partially automated, by means of a supply device 2 shown purely schematically in FIG. 2, which is configured for the continuous or discontinuous supply of corresponding compact plastic material particles. A corresponding supply device 2 can, for example, be a conveying device by means of which the compact plastic material particles to be processed into corresponding cellular plastic particles can be conveyed to or into a loading device 3 carrying out the second step of the method. A corresponding conveying device can be configured, for example, as a belt conveying device or flow conveying device, or can comprise such a device. Conveying the compact plastic material particles to or into a loading device 3 carrying out the second step of the method can therefore involve picking up the compact plastic material particles in a conveying flow, the compact plastic material particles can therefore be conveyed by means of a conveying flow to or into a loading device 3 carrying out the second step of the method.

In a second step S2 of the process, the compact plastic material particles are loaded with a blowing agent at least under the influence of pressure. The compact plastic material particles are thus loaded with a blowing agent in the second step at least under the influence of pressure—if necessary, depending on the material, a specific (increased) temperature can also be applied in addition to a specific pressure. In the second step, therefore, generally at least one measure for loading the compact plastic material particles with a blowing agent is carried out at least under the influence of pressure, hence at least pressurized. Phenomenologically, an enrichment of the blowing agent in the respective compact plastic material particles typically takes place in the second step of the method. The enrichment of the blowing agent in the respective compact plastic material particles can, in particular depending on the chemical configuration of the compact plastic material particles, the blowing agent as well as the additives or materials possibly contained therein as well as depending on the, as mentioned, typically also material-dependent selected pressure or temperature conditions, for example result from or through absorption and/or dissolution processes of the blowing agent in the respective compact plastic material particles.

Gases, such as carbon dioxide or a mixture containing carbon dioxide and/or nitrogen, such as air, can be used as blowing agents. In general, any combustible or non-combustible organic gases, i.e. in particular butane or pentane; or inert gases, such as noble gases i.e. in particular helium, neon, argon; or nitrogen, or mixtures thereof can be used. The term "blowing agent" can therefore also include a mixture of chemically and/or physically different blowing agents. The blowing agent is typically selected taking into account its solubility in the compact plastic material particles, thus taking into account the chemical composition of the compact plastic material particles. If the compact plastic material particles contain additives or additive materials, the properties, such as chemical and/or physical configuration of the additives or additive materials, can also be taken into account when selecting the blowing agent.

The second step S2 of the method can be carried out, if necessary, at least partially automated or partially automated, by means of a loading device 3 shown purely schematically in FIG. 2, which is configured for loading the compact plastic material particles with a blowing agent at least under the influence of pressure or for carrying out a corresponding loading process. A corresponding loading device 3 can, for example, be configured as an autoclave device, i.e. generally as a pressure vessel device 3.1 comprising a pressure or process chamber, or comprise such a pressure vessel device. A corresponding loading device 3 can further comprise a temperature control device 3.2, which is configured for temperature control of a corresponding pressure or process chamber. A corresponding loading device can in all cases comprise a control and/or regulation unit 3.3 implemented in hardware and/or software, which is configured for controlling and/or regulating, i.e. generally for setting, certain dynamic and/or static pressure and/or temperature parameters within the pressure or process chamber.

In a third step S3 of the process, the compact plastic material particles loaded with blowing agent are expanded to produce cellular plastic particles under the influence of temperature, i.e. in particular elevated temperature. Thus, in the third step of the method, the compact plastic material particles loaded with blowing agent are typically exposed to elevated temperature, i.e., generally thermal energy, resulting in outgassing and expansion of the blowing agent contained in the compact plastic material particles. In particular, the outgassing of the blowing agent in the thermally softened or softened compact plastic material particles causes the plastic material particles to expand, which after cooling or "freezing" leads to the formation of plastic particles having a permanent cellular structure and thus to the formation of the cellular plastic particles to be produced. Accordingly, in the third step S3 of the process, in general, at least one measure is taken for outgassing or expanding the blowing agent contained in the compact plastic material particles softening or softening at least due to the influence of temperature and thus at least thermally, in order to produce cellular plastic particles. Phenomenologically, in the third step of the method, in particular due to the desorption of the blowing agent from the softening or softened compact plastic material particles, cell formation and cell growth take place within the compact plastic material particles, which leads to the cellular plastic particles to be produced. The cell formation is typically based on the aforementioned desorption of the blowing agent at nucleation points in the plastic material particles softening or softened by temperature influence, while the cell growth is typically based on an overpressure-induced expansion of the blowing agent in already formed cells. As also mentioned, the cellular structure formed in this way or the expansion state realized with it is permanently "frozen" or fixed by the or a temperature reduction of the cellular plastic particles produced in this way, i.e. by their cooling, e.g. in the environment.

Basically, after the pressurization in the second step S2 of the process, i.e. after a pressure drop, in particular to normal or standard conditions, desorption processes take place within the respective compact plastic material particles which are loaded with blowing agent and typically softened due to thermal conditions. The desorption processes of the blowing agent represent an essential prerequisite for the cell formation and cell growth processes within respective plastic material particles required for the production of cellular plastic particles. In the third step S3 of the process, the cellular plastic particles to be produced according to the method are formed from the compact plastic material particles which are present after the second step S2 of the process, are loaded with blowing agent and are typically softened due to thermal conditions, in particular as a result of corresponding desorption processes. As will be explained further on, cellular structures with locally different cell properties and thus graded cellular plastic particles can be realized by controlling corresponding desorption-related cell formation and cell growth processes.

Nucleation in conjunction with targeted adjustment of the softening behavior has a decisive influence on the desorption of the blowing agent. In particular, a large number of small cells can be formed by a large number of individual nucleation points, resulting in a fine cell structure within the respective cellular plastic particles. A corresponding fine cell structure is characterized in particular by small cells and a largely homogeneous distribution of these within respective cellular plastic particles.

In general, cellular plastic particles with a cell size in the range between 0.5 and 250 μm can be produced. The actual cell size—of course an average is typically referred to here—can therefore be adjusted over a very wide range and thus tailored to the process, depending on the selected process conditions. The same applies to any distribution of the cell size within the respective cellular plastic particles.

In particular, cellular plastic particles with a (mean) cell size below 100 μm, in particular below 75 μm, further in particular below 50 μm, further in particular below 25 μm, can be formed with the process.

The third step S3 of the method can be carried out, if necessary, at least partially automated or partially automated, by means of an expansion device 4, which is configured to expand the blowing agent for the production of cellular plastic particles at least under the influence of temperature or to carry out a corresponding expansion process. A corresponding expansion device 4 can, for example, be configured as a heating device, i.e. generally as a temperature control device 4.1 comprising a temperature-controlled or temperature-regulated temperature control or process chamber, or comprise such a temperature control device. A corresponding tempering device 4.1 can further comprise a conveying device 4.3, which is configured for conveying the plastic material particles to be expanded along a conveying path through a corresponding tempering or process chamber. A corresponding expansion device 4 can in all cases comprise a control and/or regulation unit 4.2 implemented in terms of hardware and/or software, which is configured for controlling and/or regulating, i.e. generally for setting, certain dynamic and/or static conveying and/or temperature and/or radiation parameters within a corresponding tempering or process chamber.

The density of the cellular plastic particles produced in the third step S3 of the method is significantly below the density of the compact plastic material particles provided in the first step S1, resulting in the cellular properties of the plastic particles that can be produced or produced according to the method. The bulk density of the cellular plastic particles produced in the third step S3 of the method is typically many times lower than the bulk density of the compact plastic material particles produced in the first step S1 of the process.

The cellular plastic particles produced in the third step S3 of the method can be expandable, as mentioned, this can be an essential property for the described, in particular steam-based or non-steam-based, further processing of the cellular plastic particles for the production of particle foam moldings.

As indicated, the loading of the compact plastic material particles with a blowing agent can be carried out under the influence of pressure and temperature. The parameters that can thus be varied for loading the compact plastic material particles with blowing agent and, subsequently, for the specific setting of certain properties of the cellular plastic particles to be produced or produced, in particular depending on the material, are thus initially the pressure and temperature conditions prevailing in the second step S2 of the process. Of course, the time, i.e. in particular the duration of the pressure and temperature conditions in the second step of the method, is also a parameter which has an influence on the loading of the compact plastic material particles with blowing agent, i.e. in particular the dissolution of the blowing agent in the compact plastic material particles.

The loading of the compact plastic material particles with the or a blowing agent can be carried out, for example, in particular depending on the chemical composition of the compact plastic material particles and/or the blowing agent, for example, at a pressure in a range between 1 and 200 bar. The pressure refers in particular to the pressure within a pressure or process chamber of a corresponding loading device 3 during the execution of the second step S2 of the process.

The loading of the compact plastic material particles with the or a blowing agent can be carried out, for example, in particular depending on the chemical composition of the compact plastic material particles and/or the blowing agent, at a temperature, for example, in a range between 0 and 200° C. The temperatures refer in particular to temperatures within a pressure or process chamber of a corresponding loading device during the execution of the second step S2 of the process.

The loading of the compact plastic material particles with the blowing agent or a blowing agent can be carried out, for example, in particular depending on the chemical composition of the compact plastic material particles and/or the blowing agent, for a period of time, for example, in a range between 1 and 1000 hours. The above-mentioned, as mentioned, exemplary time durations refer in particular to the pressurization or temperature application of the plastic material particles within a pressure or process chamber of a corresponding loading device 2 during the execution of the second step S2 of the process.

The expansion of the plastic material particles loaded with blowing agent for the production of the cellular plastic particles under the influence of temperature, in particular depending on the chemical composition of the plastic particle material loaded with blowing agent and/or the blowing agent, can be carried out, for example, at normal pressure, i.e. an ambient pressure of approx. 1 bar. A special pressure level, such as a positive or negative pressure level, is therefore possible, but not absolutely necessary, for expanding the compact plastic material particles loaded with blowing agent to produce the cellular plastic particles, which fundamentally simplifies the expansion process.

The expansion of the plastic material particles loaded with blowing agent to produce the cellular plastic particles under the influence of temperature can be carried out, for example, in particular depending on the chemical composition of the plastic particle material loaded with blowing agent and/or the blowing agent, at a temperature, for example, in a range between 0 and 300° C. In particular, the above temperatures can refer to an inlet temperature when the compact plastic material particles loaded with blowing agent enter a corresponding expansion device 4 and/or to an outlet temperature when the cellular plastic particles exit a corresponding expansion device 4. Corresponding inlet and outlet temperatures can be the same, similar or different. Provided that a corresponding expansion device 4 comprises a conveying device 4.3, which is arranged to convey the plastic material particles loaded with blowing agent along corresponding tempering devices 4.1, the aforementioned temperatures can refer to a temperature upon entry of the compact plastic particle material loaded with blowing agent into a corresponding expansion or tempering device 4.1 (inlet temperature). temperature control device 4.1 (inlet temperature), thus to an initial area of a corresponding conveying device 4.3, and/or to an outlet temperature when the plastic particles leave a corresponding expansion or temperature control device 4 (outlet temperature), thus to an end area of a corresponding conveying device. Typically, the inlet temperature is lower than the outlet temperature.

The expansion of the compact plastic material particles loaded with blowing agent under the influence of temperature can be achieved by irradiating the compact plastic material particles loaded with blowing agent with high-energy thermal radiation, in particular infrared radiation. The temperature control, i.e. in particular the heating, of the compact plastic material particles loaded with blowing agent can be achieved, in particular depending on the material, by selecting and/or adjusting the properties of high-energy radiation, i.e. This means that the heating of the compact plastic material particles loaded with blowing agent can be carried out in a targeted manner, in particular depending on the material, by selecting and/or adjusting the properties of the energy-rich radiation, i.e. in particular its wavelength, without risking a softening of the compact plastic material particles loaded with blowing agent which is undesirable for the expansion method for the plastic material particles loaded with blowing agent, i.e. undesirable melting or through-melting of the softened plastic material particles. Investigations have shown that infrared radiation is particularly suitable for this purpose, as it enables targeted and, in conjunction with a conveying device 4.3, very controllable volume heating of the compact plastic material particles loaded with blowing agent, a controllable softening process and thus—this is essential for setting the properties of the cellular plastic particles to be produced—a controllable expansion process.

In particular, the expanding of the plastic material particles loaded with blowing agent can take place under the influence of temperature by irradiating the compact plastic material particles loaded with a blowing agent with high-energy thermal radiation, in particular infrared radiation, wherein the plastic material particles loaded with blowing agent are conveyed on at least one conveying path defined by a conveying device 4.3, in particular continuously, along at least one corresponding high-energy radiation, i.e. in particular infrared radiation, generating radiation generating device 4.4. A corresponding radiation generating device 4.4 can in particular be configured as or comprise an infrared oven, in particular a continuous infrared oven. A corresponding infrared oven can comprise one or more infrared emitters arranged or formed along a corresponding conveying path. Corresponding infrared emitters can, for example, have a radiation power, which can be variable, in a range between 1 and 500 kW. The above-mentioned powers can refer in particular to area power per $m^2$. In particular, area powers between 5 and 100 $kW/m^2$ can be used. Variable radiators or variable radiator (area) powers can be used to generate different temperature zones, which also provides a parameter for influencing the expansion process.

According to the method, after the expansion of the plastic material particles loaded with blowing agent for the production of the cellular plastic particles, cooling of the produced cellular plastic particles can be carried out under the influence of a temperature (in particular lower than that of the previous expansion process), as indicated above. The cooling, which is expediently carried out rapidly, can result in a "freezing" of the cellular structure of the cellular plastic particles after the expansion process. In this way, further, integral or even only local expansion of the plastic particles, which can be undesirable after the expansion process, can be specifically prevented, for example in order to retain a cellular structure of the plastic particles which can be desired after the expansion process. In particular, cooling can be carried out from a process temperature above a reference temperature, in particular room temperature can be used as a reference temperature, to a cooling temperature below the process or reference temperature, in particular room temperature. Separate tempering devices for cooling the plastic particles are therefore not absolutely necessary, but it can be sufficient if the plastic particles are cooled to room temperature or aged at room temperature after the expansion process.

According to the method, as also indicated above, a compact plastic particle material containing at least one, in particular functional, additive or additive material, for example a fibrous substance or material and/or a dye or coloring material and/or a nucleating substance or material and/or a substance or material for specifically influencing or controlling the softening behavior of the plastic material particles loaded with blowing agent, can be provided or used. Accordingly, compounded compact plastic material particles can also be loaded with blowing agent and expanded, resulting in cellular plastic particles with special properties. In particular, tailor-made plastic particles can be produced for specific applications or fields of application through a targeted selection and concentration of appropriate additives or materials. The additives or materials can have been introduced into the compact plastic material particles during their manufacture.

Particularly by means of fibrous substances or materials—which can basically be organic or inorganic fibrous substances or materials, e.g. aramid, glass, carbon or natural fibers—special material properties of the cellular plastic particles that can be or are produced according to the method or of a molded particle foam part produced from the cellular plastic particles that can be or are produced according to the method can be realized with regard to further processing. Corresponding cellular plastic particles or particle foam moldings produced from these can be characterized on the one hand by a special density due to their cellular structure and on the other hand in particular by special mechanical properties due to mechanical connections of adjacent cells within respective cellular plastic particles and/or between respective adjacent cellular plastic particles resulting from processing. During subsequent processing into particle foam moldings, these special mechanical properties can be utilized locally or integrally or can be further modified. The same applies—basically irrespective of their chemical composition—to non-fibrous or -shaped additives or additive materials, such as spherical or -shaped or platelet-like or -shaped organic and/or inorganic additives or additive materials.

In addition to specifically influencing the mechanical properties of the plastic particles, it is also possible, for example, to specifically influence the electrical properties and/or the thermal properties of the plastic particles by means of appropriate additives or materials. Thus, plastic particles with special electrically and/or thermally conductive properties can be produced, for example by means of electrically and/or thermally conductive additives or materials, such as metal and/or carbon black particles, etc.

The concentration of corresponding additives or additive materials can in principle be freely selected, although typically depending on the material. Thus, it is merely indicated by way of example that compact plastic material particles with one (or more) additive(s) or additive material(s) can be provided or used in a (respective) concentration between 0.01 wt. %, this applies in particular to chemically active additives, and 60 wt. %, this applies in particular to fibrous additives. As indicated, the concentration typically depends on the specific chemical and/or physical properties of the additives or additive materials or their combination.

According to the method, basically any thermoplastic plastic material can be provided or used as starting material. For example, according to the method, a plastic particle material from the group: Acrylonitrile-butadiene-styrene, Acrylonitrile-butadiene-styrene blend, Polyamide, Polyamide blend, Polycarbonate, Polycarbonate blend, Polyethylene, Polyethylene blend, Polypropylene, Polypropylene blend, Polyphenylene ether, Polyphenylene ether blend, thermoplastic elastomer, polyethylene terephthalate, polyethylene terephthalate blend, polybutylene terephthalate, polybutylene terephthalate blend, polystyrene, polystyrene blend, polyvinyl chloride, thermoplastic elastomer blend. used.

According to the method, depending on the selected process conditions, cellular plastic particles with a uniformly or non-uniformly distributed cellular structure can be produced, for example. The properties, i.e. in particular the distribution of the cellular structure, within the respective cellular plastic particles can therefore (also) be influenced by pressure, temperature and time during loading or expanding as well as by the conveying times or conditions between the individual method steps S1-S3, in addition to material-specific parameters.

If cellular plastic particles with an unevenly distributed cellular structure are produced according to the method, the respective cellular plastic particles can have a different number and/or morphology of cells in a peripheral region than in a core region. Graded cellular plastic particles can therefore be produced which have a special range of properties due to the different distribution of the number of cells and/or cell morphology. Graded cellular plastic particles can therefore, for example in the manner of core-shell particles, have different cellular properties in an (outer) peripheral region than in an (inner) core region.

In general, it is also true that, depending in particular on the degree of expansion and, where appropriate, the filler content, cellular plastic particles with a bulk density in a range between 20 and 1500 g/I can be produced by the process. The actual bulk density—here, too, of course, an average is typically referred to—can thus be adjusted over a very wide range and thus tailor-made, depending on the selected process conditions.

The embodiment example of an apparatus 1 for carrying out the method shown in FIG. 2 comprises the aforementioned supply device 2, the loading device 3, which is generally designable as a first device, which is configured for loading the compact thermoplastic with a blowing agent under the influence of pressure, and the expansion device 4, which is generally designable as a second device, which is configured for expanding the blowing agent for the production cellular plastic particles under the influence of temperature.

The staging device 2 can comprise by a suitable handling device for handling the compact plastic material particles for staging them. In an analogous manner, although not shown, the apparatus 1 can comprise a handling device 5 downstream of the expansion device 4 for removing the produced cellular plastic particles. Corresponding handling devices can, as mentioned, be configured as or comprise conveying devices. In particular, conveying devices suitable for conveying bulk material, such as pneumatic conveying devices, which are configured to form a conveying flow, can be considered.

As mentioned, the second device can comprise a conveying device, in particular a combined conveying and temperature control device. A corresponding combined conveying and temperature control device can, for example, be configured as a continuous furnace, in particular as an infrared continuous furnace comprising one or more infrared emitters, or can comprise at least one such infrared continuous furnace.

The second device can also be assigned a stress-relieving device (not shown), such as a stress-relieving chamber, in which the manufactured cellular plastic particles are stored (stress-relieved) under defined chemical and/or physical conditions, i.e. in particular defined temperature ratios, for a defined time. A corresponding stress-relieving device can, for example, be configured as a decompression device or comprise such a device.

In all embodiment examples, it is conceivable that the device 1 comprises a conveying device, by means of which the compact plastic material particles or, further on, the cellular plastic particles are conveyed continuously or discontinuously through the individual devices 2-4.

FIG. 3 shows a principle representation of a cellular plastic particle produced according to the method in accordance with an embodiment example in a sectional view. Specifically, this is a section of a microscopic image of a cellular plastic particle with a bulk density of approx. 120 g/l, produced in according to the method from compact PBT with a bulk density of approx. 375 g/l.

FIG. 4 shows a principle representation of a cellular plastic particle produced according to the method in accordance with an embodiment example. The principle illustration shows a cellular plastic particle with locally different cellular properties and thus a graded cellular plastic particle. Specifically, the cellular plastic particle has a non-uniformly distributed cellular structure than the plastic particle has a different number of cells in a peripheral region R, namely a higher number of cells than in a core region K. The dashed inner line indicates that the transitions between the peripheral region R and the core region K can be continuous. The peripheral region R can, if necessary, be locally different in intensity.

The invention claimed is:

1. A method for producing cellular plastic particles, comprising the steps:

providing a plastic material comprising compact plastic material particles, loading of the compact plastic material particles with a gaseous blowing agent under the influence of pressure, wherein the gaseous blowing agent is a gas, expanding the compact plastic material particles loaded with the gaseous blowing agent to produce cellular plastic particles under influence of temperature, wherein the expanding of the plastic material particles loaded with the gaseous blowing agent takes place under the influence of temperature by irradiating the plastic material particles loaded with the gaseous blowing agent with infrared radiation.

2. The method according to claim 1, wherein the loading of the compact plastic material particles with the gaseous blowing agent is additionally carried out under the influence of temperature.

3. The method according to claim 1, wherein the loading of the compact plastic material particles with the gaseous blowing agent is carried out at a pressure in a range between 5 and 200 bar.

4. The method according to one claim 1, wherein the loading of the compact plastic material particles with the gaseous blowing agent is carried out at a temperature in a range between 0 and 300° C.

5. The method according to claim 1, wherein the loading of the compact plastic material particles with the gaseous blowing agent is carried out for a period of time in a range between 1 and 1000 h.

6. The method according to claim 1 wherein the expanding of the plastic material particles loaded with the gaseous blowing agent is carried out under the influence of temperature at a temperature in a range between 0 and 300° C.

7. The method according to claim 1, wherein the expanding of the plastic material particles loaded with the gaseous blowing agent takes place under the influence of temperature by irradiating the plastic material particles loaded with the gaseous blowing agent with infrared radiation, wherein the plastic material particles loaded with the gaseous blowing agent are conveyed on at least one conveying path along at least one radiation generating device generating corresponding infrared radiation.

8. The method according to claim 1, wherein, after expanding the plastic material particles loaded with the gaseous blowing agent to produce the cellular plastic particles under the influence of temperature, cooling of the cellular plastic particles from a process temperature to a cooling temperature below the process temperature is carried out.

9. The method according to claim 1, wherein a compact plastic particle material containing at least one, in particular functional, additive or additive material, in particular a fibrous substance or material and/or a dye or coloring material and/or nucleating agents and/or additives for specifically influencing the softening behavior, is provided or used.

10. The method according to claim 9, wherein plastic material particles with at least one additive or additive material is provided or used in a concentration between 0.01 wt. % and 60 wt. %.

11. The method according to claim 1, wherein a compact plastic particle material selected from the group: Acrylonitrile butadiene styrene, Acrylonitrile butadiene styrene blend, Polyamide, Polyamide blend, Polycarbonate, Polycarbonate blend, Polyethylene, Polyethylene blend, Polypropylene, Polypropylene blend, Polyphenylene ether, Polyphenylene ether blend, thermoplastic elastomer, polyethylene terephthalate, polyethylene terephthalate blend, polybutylene terephthalate, polybutylene terephthalate blend, polystyrene, polystyrene blend, polyvinyl chloride, thermoplastic elastomer blend is provided or used.

12. The method according to claim 1, wherein cellular plastic particles having a uniformly or non-uniformly distributed cellular structure are produced.

13. The method according to claim 12, wherein cellular plastic particles having a non-uniformly distributed cellular structure within respective cellular plastic particles are produced, wherein respective cellular plastic particles have a different number and/or morphology of cells in a peripheral region than in a core region.

14. The method according to claim 1, wherein carbon dioxide, nitrogen or a mixture containing carbon dioxide and/or nitrogen is used as the gaseous blowing agent.

15. The method according to claim 1, wherein characterized in that cellular plastic particles having a cell size in a range between 1 and 250 μm are produced.

16. The method according to claim 1, wherein cellular plastic particles having a bulk density in a range between 20 and 1500 g/l are produced.

17. A plastic particulate material, which is formed by or comprises cellular plastic particles produced according to a method according to claim 1.

18. The method for processing a plastic particulate material according to claim 17 to produce a three-dimensional object.

19. An apparatus for the production of cellular plastic particles according to a method according to claim 1, comprising:

a first device which is configured for loading compact plastic material particles with a gaseous blowing agent under the influence of pressure, wherein the device comprises in particular a pressure vessel device; and a second device, which is configured for expanding the gaseous blowing agent for the production cellular plastic particles under the influence of temperature, wherein the device comprises in particular a radiation generating device for generating infrared radiation.

* * * * *